United States Patent
Blanchet et al.

(10) Patent No.: US 6,357,310 B1
(45) Date of Patent: Mar. 19, 2002

(54) DEVICE FOR DISPLACING A MEMBER INSIDE AN ELONGATE TUBE FROM ONE END OF THE TUBE

(75) Inventors: André Blanchet, Boutigny Prouais; Jean-Louis Labrune, Chatou, both of (FR)

(73) Assignee: Cegelec, Rueill-Malmaison (FR)

( * ) Notice: Subject to any disclaimer, the term of this patent is extended or adjusted under 35 U.S.C. 154(b) by 0 days.

(21) Appl. No.: 09/606,007

(22) Filed: Jun. 29, 2000

(30) Foreign Application Priority Data

Feb. 7, 1999 (FR) .............................. 99 08533

(51) Int. Cl.[7] .................. F16H 27/02; F16H 29/20; G01D 21/00
(52) U.S. Cl. .......................... 74/89.21; 73/866.5; 474/2
(58) Field of Search .............................. 74/89.37, 89.2, 74/33, 89.22, 34, 89.21, 422; 318/602; 73/866.5, 37, 45.1; 198/605, 461, 627, 177; 83/318, 319, 320

(56) References Cited

U.S. PATENT DOCUMENTS

| | | | |
|---|---|---|---|
| 3,399,578 A | * | 9/1968 | Lindabury, Sr. et al. ... 74/89.21 |
| 3,824,871 A | * | 7/1974 | Loesch et al. .............. 74/37 X |
| 3,926,040 A | | 12/1975 | Cowell |
| 4,173,278 A | * | 11/1979 | Reitter .................... 198/605 X |
| 4,570,617 A | * | 2/1986 | Baus ......................... 74/33 X |
| 4,638,667 A | | 1/1987 | Zimmer et al. |
| 4,753,119 A | * | 6/1988 | Kuspert .................... 74/89.21 |
| 5,081,876 A | * | 1/1992 | Marshall .................... 74/89.21 |
| 5,819,584 A | * | 10/1998 | Evans ....................... 74/89.21 |
| 5,950,513 A | * | 9/1999 | Bourakovski ................ 83/318 |

FOREIGN PATENT DOCUMENTS

| | | |
|---|---|---|
| EP | 0 086 342 A1 | 8/1983 |
| JP | 59 044 654 A | 3/1984 |
| JP | 62 047 539 A | 3/1987 |
| JP | 03 153 457 A | 7/1991 |
| JP | 03 153 458 A | 7/1991 |
| WO | 96/13838 A | 5/1996 |

* cited by examiner

*Primary Examiner*—David A. Bucci
*Assistant Examiner*—Marcus Charles
(74) *Attorney, Agent, or Firm*—Sughrue Mion, PLLC

(57) ABSTRACT

A device for displacing a member in a graduated and motor-driven manner inside a tube that is external to the device, the member being displaced from one end of the tube, the displacement being evaluated by at least one position encoder delivering information on the position of the member placed at one end of a tubular element which is mounted to move in translation on a support body for supporting the device. The tubular element is in the form of a member-carrying worm which is provided with longitudinal toothed racks on its periphery. The worm is displaced in translation relative to the body which carries it under the action of a first toothed belt which is mounted on the support body, which is driven by a motor fixed to the body, and which is meshed with one of the racks. Another of the racks meshes with a second toothed belt which entrains a position encoder fixed to the body.

7 Claims, 2 Drawing Sheets

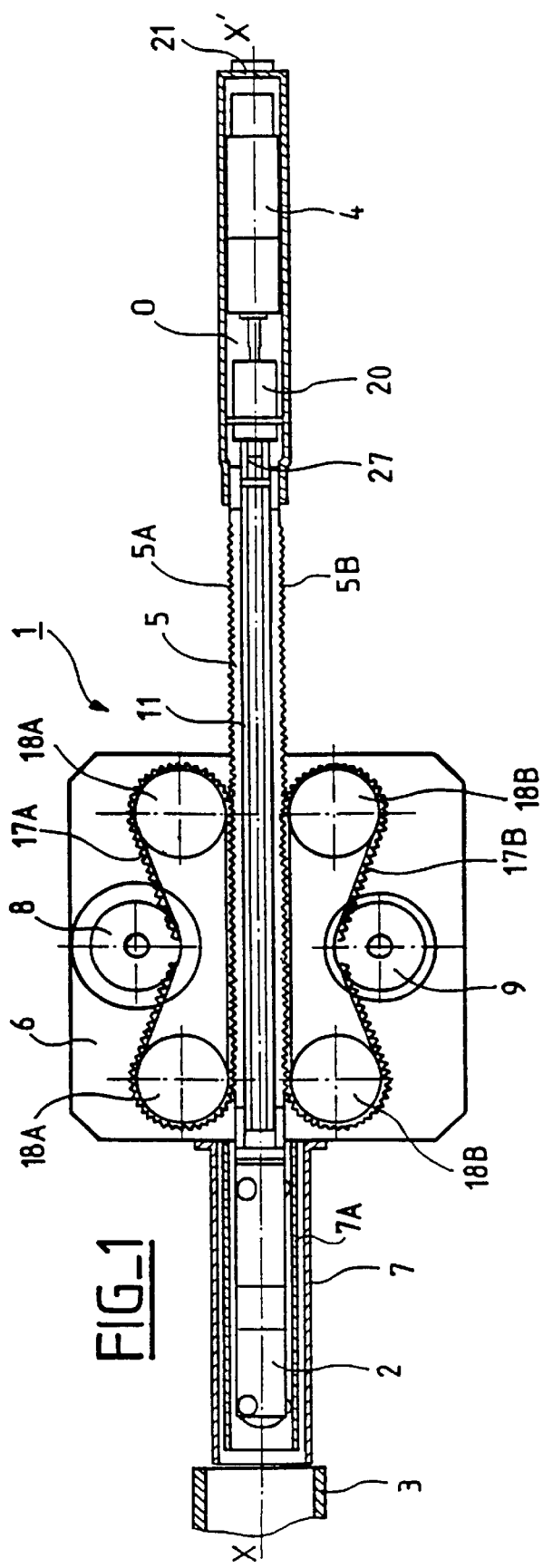
FIG_1
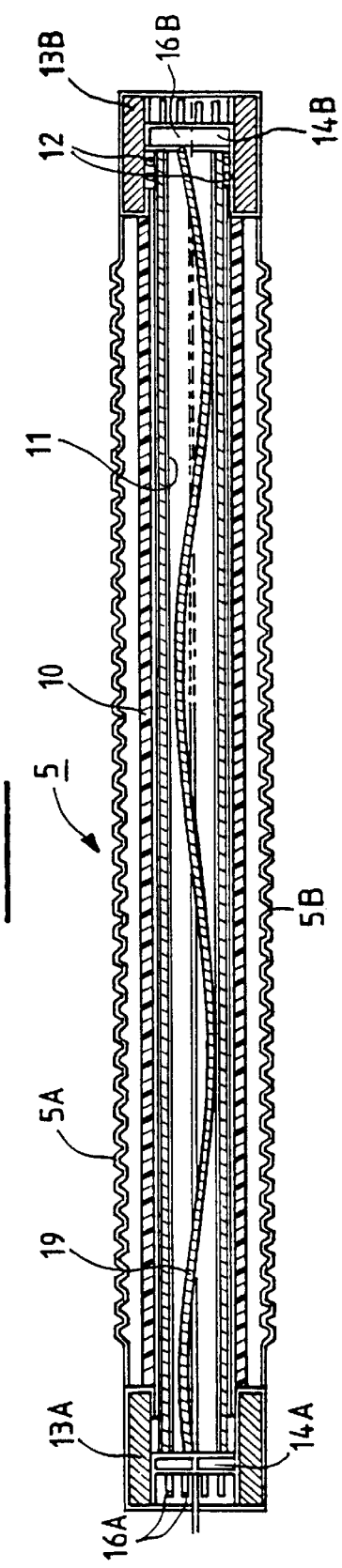
FIG_2

FIG_3
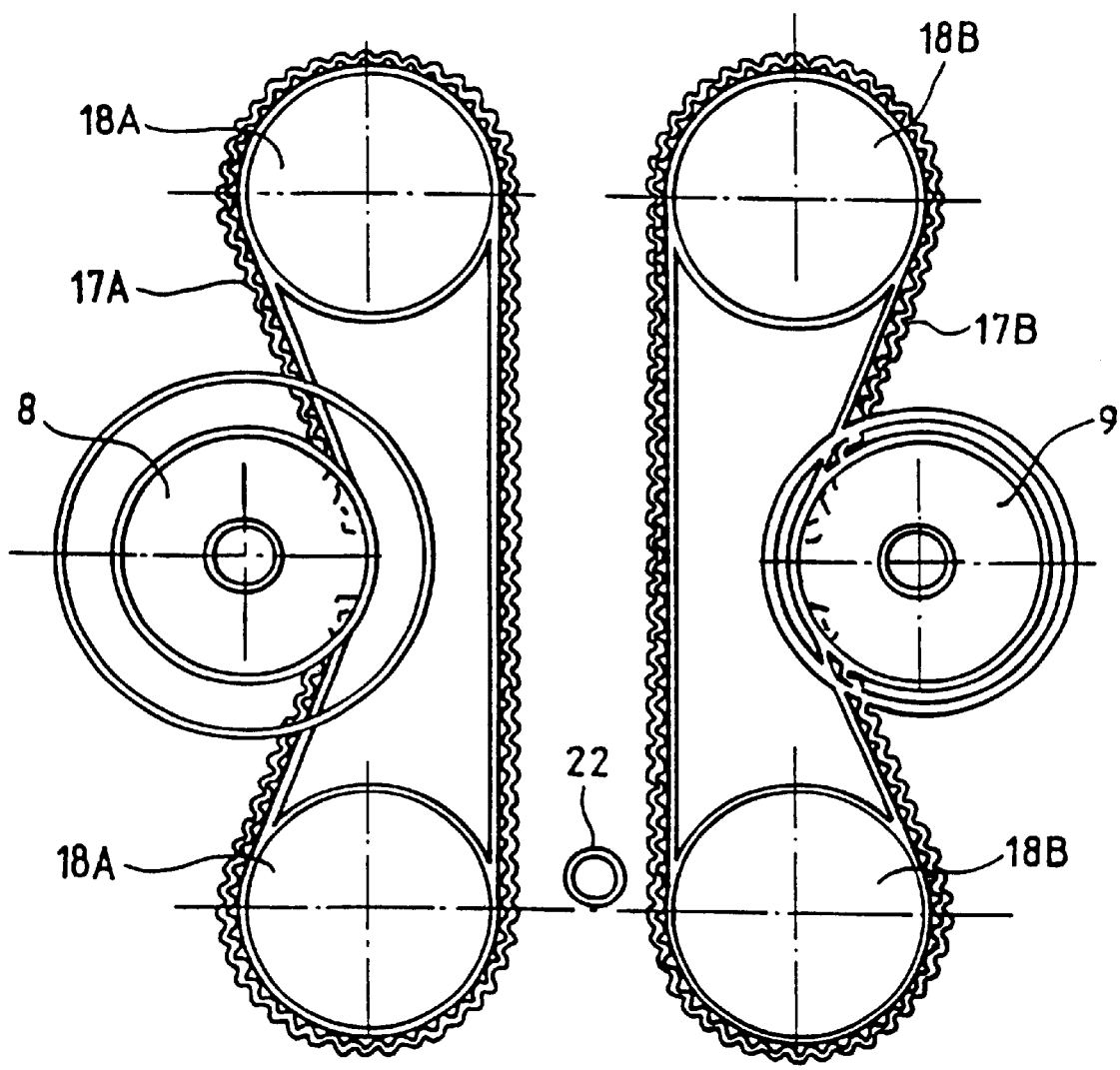

DEVICE FOR DISPLACING A MEMBER INSIDE AN ELONGATE TUBE FROM ONE END OF THE TUBE

The invention relates to a device for displacing a member in a graduated manner inside a tube that is held stationary and that is external to the device, the member being displaced from one end of the tube, relative to which end the device is positioned prior to the displacement. The invention relates in particular to a device for displacing a state verification member, e.g., a crack detection member, in a graduated manner inside a tube that is held stationary. Such a device is, in particular, organized to verify the state of multiple tubes included in a steam generator of a nuclear power plant.

BACKGROUND OF THE INVENTION

Known devices which make it possible to displace a member in a graduated manner inside a tube that is held stationary, the member being displaced from one end of the tube, are commonly expensive, in particular when the displacement must be performed over a relatively long length. That applies particularly when the member is fixed to one end of a tubular support element which is displaced in translation relative to a support body that is held stationary and that carries it. The length of the tubular element tends to limit the accuracy of the indications obtained from displacement measurements which are performed to determine the position of the member inside the tube in which it is being displaced. Slippage often occurs between the tubular element and the encoder that delivers the displacement indications. That is problematic in particular when the displaced member is a state inspection probe whose location must be determined with accuracy in order to be able to map the inside of the tube as exactly as possible, e.g., during an operation for detecting flaws.

OBJECTS AND SUMMARY OF THE INVENTION

The invention thus provides a device for displacing a member in a graduated and motor-driven manner inside a tube that is held stationary and that is external to the device, the member being displaced from one end of the tube, relative to which end the device is positioned prior to the displacement, the displacement being evaluated by means of at least one position encoder delivering information on the position of the member placed at one end of a tubular element which is mounted to move in translation on a support body for supporting the device.

According to a characteristic of the invention, the tubular element is in the form of a member-carrying worm which is provided externally with longitudinal toothed racks distributed around its periphery, and which is displaced in translation relative to the body which carries it under the action of a first toothed belt which is mounted on the support body, which is driven by a motor fixed to the body, and which is meshed with one of the racks, another of the racks meshing with a second toothed belt which is mounted on the support body and which entrains a position encoder fixed to the body for the purpose of delivering information relating to the position of the member as it is displaced.

According to a characteristic of the invention, the tubular element forming the worm is a flexible tubular element.

According to a characteristic of the invention, the tubular element forming the worm is a hollow tubular element inside which a hollow rotary shaft is received, which shaft is coupled at each of its ends to a respective rotary coupling piece provided with mechanical or electro-mechanical means making it possible to rotate the member by means of a motor fixed to the other end of the worm from said member, and with electrical connection means making it possible to connect the member electrically to a complementary other member via a link electrically interconnecting the two coupling pieces via the rotary shaft.

BRIEF DESCRIPTION OF THE DRAWINGS

The invention, its characteristics, and its advantages appear more clearly from the following description given with reference to the following figures:

FIG. 1 is a diagrammatic view of a member displacement device of the invention;

FIG. 2 is an axial section view through a worm of a displacement device of the invention; and FIG. 3 is a diagrammatic view of the worm drive system of a member displacement device of the invention and of the detector for detecting the initial position of the worm of this device.

DETAILED DESCRIPTION OF AN ILLUSTRATIVE EMBODIMENT

The member displacement device 1 as shown in FIGS. 1 to 3 is more particularly designed to displace a member 2 in a graduated manner inside a tube 3 external to the device and held stationary, i.e., permanently or temporarily stationary. The device also makes it possible to rotate the member 2 inside the tube 3 under the action of a motor 4 of the device, which motor is positioned outside the tube. For example, the tube may be a circularly-cylindrical tube that is preferably rectilinear or moderately arcuate. For example the length of the tube is about ten meters. For example, the member 2 may be a moving probe which is designed to be inserted into the tube 3 via one end of the tube. As is known, such members are, in particular, implemented for performing non-destructive inspection of tubes that equip or that are to equip industrial installations. The members can be mounted to rotate about their own axes, e.g., to make it possible to verify the entire periphery of the inside of a tube. In the embodiment in question, provision is thus made for the member 2 to rotate about its own middle axis which, for example, coincides with the middle axis of the tube 3 along the inside wall of which the member is displaced in translation. This thus implies that the member 2 is in register with a circular cylinder whose diameter is slightly smaller than the inside diameter of the tube 3 inside which it is to be displaced. For example, the tube 3 may be a metal tube which opens out outside a support plate (not shown) in an industrial installation, and, for example, in one of the many tubes of a steam generator of a nuclear power plant, as indicated above.

Regardless of the use of the device of the invention, it is assumed that it is necessary to know accurately the exact positioning of the member 2 inside a tube in which it is displaced, as it is being displaced.

The member displacement device 1 of the invention is made up of three subassemblies which are respectively constituted by a member-carrying worm 5, by a rotation unit 0 containing in particular the motor 4, and by a support body 6 by means of which the worm and the rotation unit are carried.

The member 2 is fixed to one end of the worm 5 with which it is displaced in translation relative to the body 6 on which the worm is mounted to move in translation between a retraction position in which the member 2 is received inside a tubular segment 7A contained in a protective sheath 7 fixed to the body 6 and an extension position in which the member is moved out of the sheath and away from the body to the maximum extent by the worm that carries it. In the embodiment in question, the tubular segment 7A constitutes a standard-forming tube organized to make it possible to test that the member 2 constituted by a probe is operating properly.

In this example, the worm 5 is constituted by a tubular element, that is relatively flexible, and outside which toothed racks are provided longitudinally, such as 5A or 5B, each of which has a profile complementary to the profile of a standardized toothed belt of the T2.5 type.

In the embodiment shown, the worm 5 is assumed to be constituted by a circularly-symmetrical tubular element whose diameter is slightly smaller than the diameter of the tube 3. Three longitudinal racks are provided disposed on respective ones of three generator lines 120° apart around the worm 5, only two of the three racks being shown under references 5A and 5B in FIGS. 1 and 2. A toothed belt carrier system known per se is provided in association with each of the racks, these systems being mounted on the support body 6.

One of the belts, such as, for example, 17A, is driven by a motor 8 (assumed to be an electric motor in this example) which is fixed to the body 6. This belt makes it possible, when the motor 8 is rotated in one direction, to displace the worm so that the member 2 comes out of its protective sheath and can penetrate into the tube 3 facing the mouth of which the protective sheath 7 for the member is placed in alignment. Rotating the motor 8 in the opposite direction then makes it possible to return the member 2 to its protective sheath 7. In the embodiment presented, the system carrying the belt 17A is such that this belt (which is an endless belt) is pressed against the rack 5A by two pulleys 18A situated on the same side of the worm 5 as the motor 8 and on either side of said motor. Presser wheels (not shown) participate in pressing the belt against the rack.

A second belt, such as, for example, 17B, is entrained by the movement of the worm 5, and it is meshed with a first incremental encoder 9 so as to deliver an accurate graduated indication of the position of the member 2, while it is being displaced in translation over the length of the tube and inside the tube. The entraining of the first incremental encoder is directly related to the displacement of the worm 5 on which the member 2 is positioned. This entraining by the action of a toothed belt makes it possible to eliminate the risks of slip or of play, and it is thus possible to obtain accurate and faithful indications on the position of the member 2 along the tube 3 into which it is inserted, regardless of the extent to which the member penetrates into the tube, within the limit of the maximum stroke allowed by the racks that are carried by the worm 5. In this example, the belt 17B is pressed against the rack 5B in the same way as the belt 17A is pressed against the rack 5A, and the first incremental encoder 9 is mounted between the pulleys 18B and on the other side thereof from the worm 5, in an assembly configuration which corresponds to that provided for the motor 8.

In the embodiment in question, in which the worm 5 has a circularly-cylindrical body which carries three identical longitudinal racks disposed 120° apart, the third of the racks is associated with a belt (not shown) whose function, in this example, is to balance the forces at the worm, while the member 2 is being displaced along the tube into which it penetrates together with a portion of the worm that carries, the length of which portion varies.

It is possible to consider making the worm in the form of a solid cylindrical element. However, in the embodiment presented, the worm 5 is preferably made in the form of a hollow tubular element, as shown in FIG. 2. For example, this tubular element may be made up of a polyurethane tube provided with an inner jacket 10 made of polyamide, and it receives a hollow rotary flexible shaft 11 carried by ball bearings 12 mounted in end-pieces, such as 13A and 13B, fixed to the ends of the tubular element that constitutes the worm 5. For example, each of these end-pieces may be made in the form of a metal bush inside which a bearing is received for supporting one of the ends of the shaft 11. Each shaft end carries a coupling piece, such as 14A or 14B, which rotates with the shaft. These rotary coupling pieces are provided with mechanical or electro-mechanical means which enable the member 2 to be rotated by the motor 4 and with electrical connection means which enable the member 2 to be connected to a complementary member via at least one link 19 interconnecting the pieces via the shaft 11.

The member 2 is fixed via one of its ends to the coupling piece 14A with which it rotates, when the shaft 11 is caused to rotate. The member is also connected to a connector 16A carried by the piece. In FIG. 2, this connector is assumed to be provided with conductor pins making it possible to connect the member 2 electrically by plugging in, and to link it up with the conductors of a cable which constitutes the link 19. In an embodiment, a link is provided by coaxial cable then serving a member 2 of the probe type, in particular an eddy-current probe or an ultrasonic or vibratory probe.

The coupling piece 14B that is situated at the other end of the shaft 11 from the piece 14A is provided with electrical connection means that correspond to those carried by the piece 14A, and that are connected like them to the link 19. These means are represented by a connector 16B in FIG. 2, which connector is, in this example, assumed to be connected directly to a complementary connector that is part of the rotation unit 0. The piece 14B is organized to rotate in the end-piece 13B about the axis thereof and to drive the shaft 11 to the end of which it is fixed by conventional means (not shown). The piece is mechanically or electro-mechanically rotated by means of a coupler 27 to which the electric motor 4 is connected via an auxiliary module 20. In this example, the module 20 associates a rotary collector with a position measurement device, such as an incremental position encoder or a synchro-resolver. The module also makes it possible to transmit the torque produced by the motor 4 to the shaft 11. The second incremental position encoder is, for example, an item of conventional equipment having a hollow shaft that delivers in indication of the angular position of its axis of rotation relative to a determined reference frame. For example, it makes it possible to differentiate between 360 different positions or points. This makes it possible to obtain very accurate information on the angular position of the member 2 being rotated, relative to a reference plane which is perpendicular to the axis XX' along which the member is displaced in translation with the worm. The rotary collector (not shown) is assumed to be a collector having conductor rings superposed about a carrier pin assumed, in this example, to be driven by the motor 4 to which it is mechanically coupled. For example, each ring enables an electrical conductor of the link 19 that is connected to the connector 16B to be maintained in connection with a member complementary to the member 2 via a stationary conductor brush against which the ring rubs on rotating the pin that carries it. This pin (not shown) drives the shaft 11 to which it is connected mechanically. A connector 21 is assumed in this example to be provided on the end wall of the unit 0 for the purpose of putting a member that is external to the assembly formed by the member 2, the worm, and the unit 0 in connection with the elements belonging to said assembly, and in particular with the conductor brushes of the rotary collector.

In a preferred embodiment, the unit 0 is organized to be mounted on the end of the worm 5 merely by being plugged into it. It then slides onto the end-piece 13B provided for it at one end of said worm. The couplings, in particular the mechanical and electrical couplings are achieved by interfitting of mechanical portions that are physically complementary, and by interfitting of electrical portions that are physically complementary.

To use a device of the invention, it is necessary to put the device in place facing the mouth of the tube 3 in alignment with which the worm 5, as retracted, is positioned. This positioning is obtained, for example, by displacing the body 6 which is, for example, mounted on a positioning robot (not shown) for this purpose. A sensing member 22 such as, for example, an optical sensor or a magnetic detector is provided, in this example, to make it possible to determine an initial reference position for the member 2 when it is retracted. As shown in FIG. 3, the sensing member 22 of the optical sensor type is positioned on the body 6 between two toothed belt carrier systems, and, for example, between the systems carrying respectively the belts 17A and 17B, so as to be masked by an element, such as a mask mounted to move with the worm that carries it.

This combination of means makes it possible to obtain an initial reference value serving to be used by the first incremental encoder 9 to measure the extent to which the member 2 penetrates into a tube after putting the device 1 in place relative to the mouth of said tube, as indicated above. In a preferred embodiment, the initial reference measurement value is obtained after moving the worm backwards until it comes into back abutment, and this is then followed by a short displacement forwards, at slow speed, whereby the mask goes past the sensor which then delivers the indication of the initial reference value. The worm is then displaced at fast speed until it reaches the start of the zone of determined length of the tube 3 that the member 2 is then to inspect. The inspection is then performed with the member 2 being displaced with predetermined translation and rotation speeds. The same initial reference value can thus be found again for a series of measurements performed successively for different zones of a tube under inspection.

The position measurement device contained by the auxiliary module 20 is initially set to a reference value relative to which the instantaneous angular positions of the member are determined as it rotates and as it moves in translation.

What is claimed is:

1. A member displacement device for displacing a-member in a graduated and motor-driven manner inside a tube that is held stationary and that is external to the device, the member adapted to be displaced from an end of the tube, the device being positioned relative to the end of the tube prior to the displacement, the member displacement device comprising:

a support body;

a tubular element which is mounted to move in translation on the support body, the member adapted to be disposed at one end of the tubular element, the tubular element including a member-carrying worm which is provided externally with a plurality of longitudinal toothed racks distributed around a periphery thereof;

a motor fixed to the support body;

a first toothed belt which is mounted on the support body and is driven by the motor, the first toothed belt being meshed with one of the racks, so as to displace the member-carrying worm in translation relative to the support body;

a position encoder fixed to the support body; and a second toothed belt which is mounted on the support body and which entrains the position encoder, the second toothed belt being meshed with another of the racks, such that the position encoder is operative to deliver information relating to a position of the member as the member is displaced.

2. The device according to claim 1, in which the tubular element forming the worm is a flexible tubular element.

3. The device according to claim 1, in which the tubular element forming the worm is a hollow tubular element inside which a hollow rotary shaft is received, the shaft being coupled at each of its ends to a respective rotary coupling piece provided with one of mechanical and electro-mechanical means operative to rotate the member by means of a further motor fixed to an other end of the worm opposite from the member, and with electrical connection means operative to connect the member electrically to a complementary other member via a link electrically interconnecting the two coupling pieces via the rotary shaft.

4. The device according to claim 1, in which the support body carries an optical sensor which determines an initial reference position for the member when the member is in a retracted position.

5. The device according to claim 1, in which the member-carrying worm is a tubular element having a circularly-cylindrical body.

6. The device according to claim 3, in which the further motor is coupled mechanically to the coupling piece driving the hollow shaft via a module including a member angular position encoder.

7. The device according to claim 6, in which the further motor and the module are mounted in a unit that is operative to be plugged into that end of the worm which is situated opposite from the one end on which the member is adapted to be positioned.

\* \* \* \* \*